May 25, 1971   A. PACCIARINI ET AL   3,580,766
METHOD FOR MANUFACTURING PNEUMATIC TIRES
Filed March 13, 1968   2 Sheets-Sheet 1
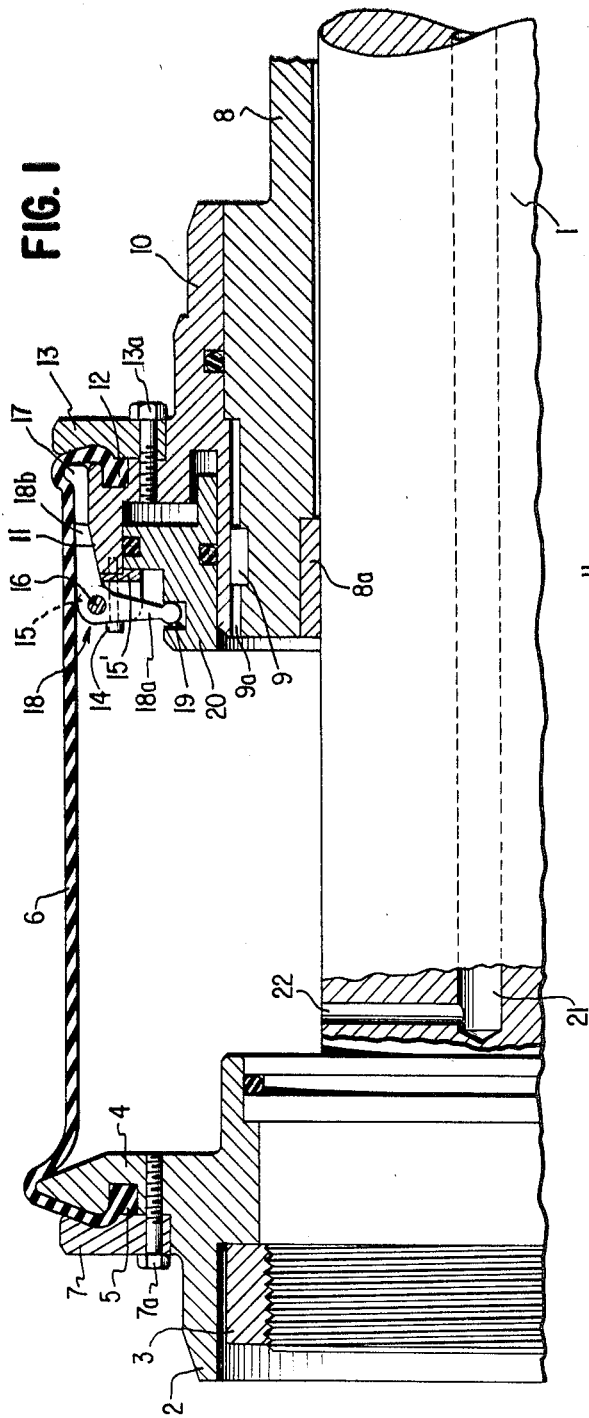
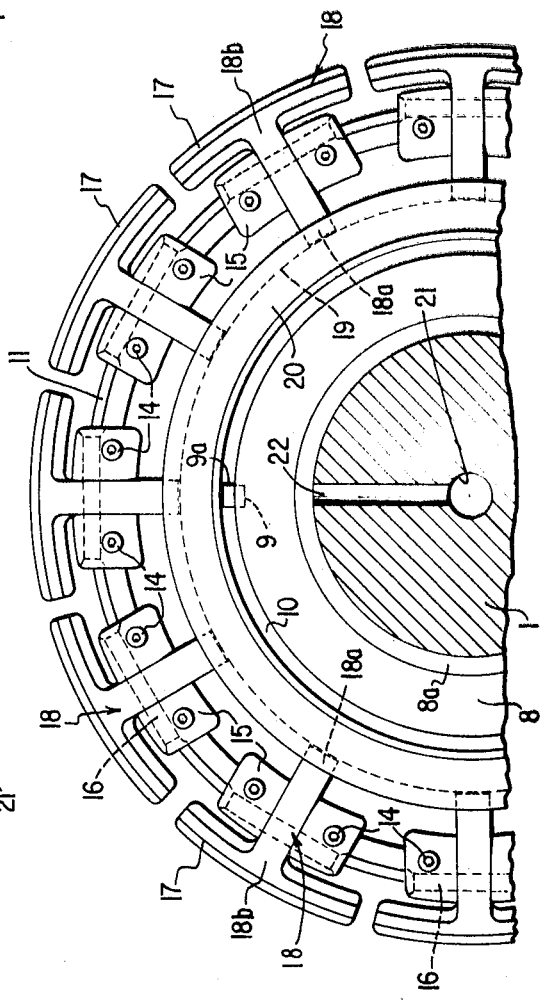
INVENTORS.
ANTONIO PACCIARINI
RENATO CARETTA
BY *Stevens, Davis, Miller & Mosher*
ATTORNEYS.

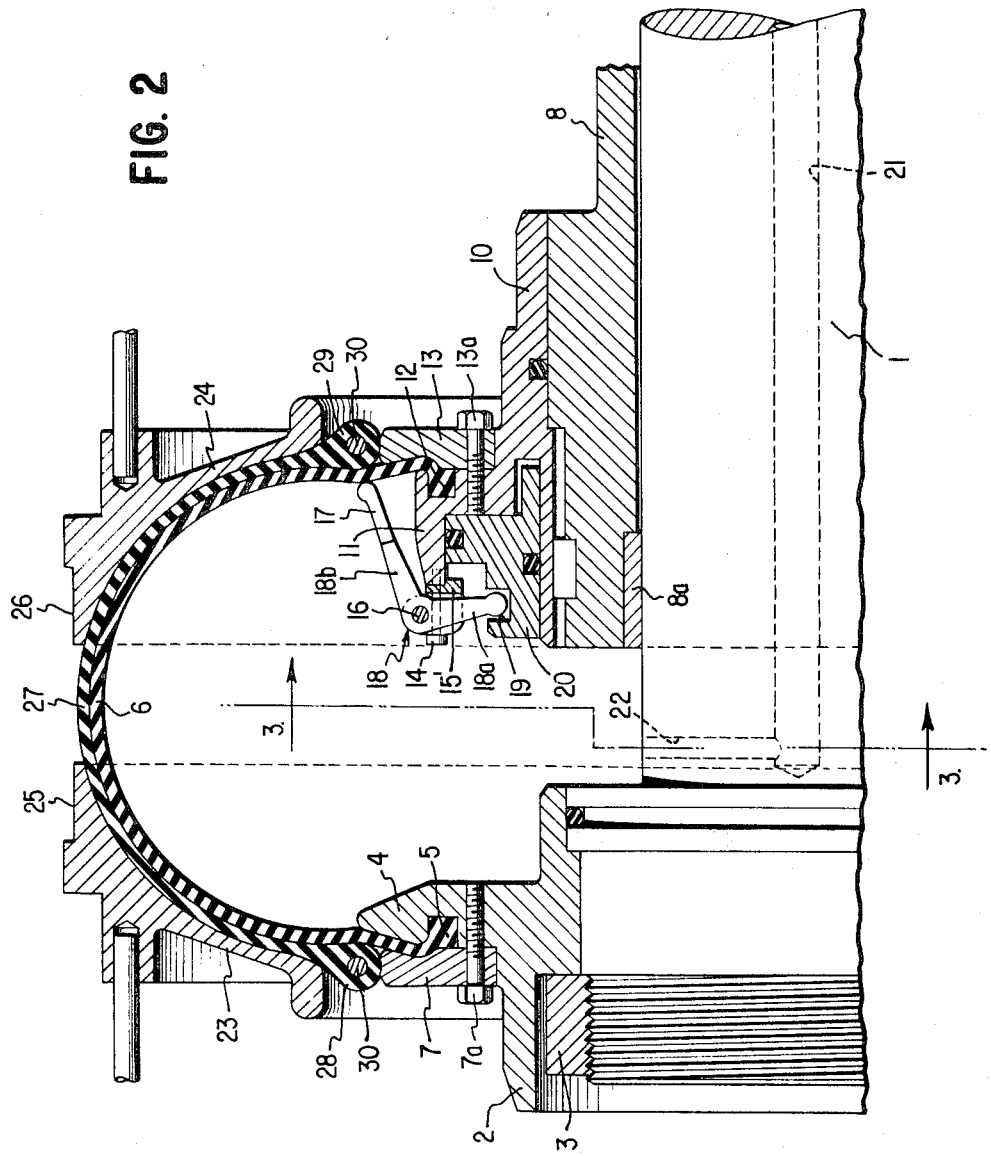

United States Patent Office 3,580,766
Patented May 25, 1971

3,580,766
METHOD FOR MANUFACTURING PNEUMATIC TIRES
Antonio Pacciarini, Milan, and Renato Caretta, Gallarate, Italy, assignors to Pirelli S.p.A., Milan, Italy
Filed Mar. 13, 1968, Ser. No. 712,749
Claims priority, application Italy, Mar. 15, 1967, 13,715
Int. Cl. B29h 17/10
U.S. Cl. 156—123                                4 Claims

ABSTRACT OF THE DISCLOSURE

A method for the manufacture of pneumatic tires wherein the tire carcass is positioned on two annular supporting surfaces and freely shaped by mutually approaching the latter and by admitting compressed fluid inside the carcass. The shaped carcass is subjected to a slight axial compression from the portion of the carcass containing the bead cores to the proximity of its median plane by means of two rigid, equal and opposite surfaces having a toroidal profile axially narrower than that corresponding to the ideal shape of the freely shaped carcass, these surfaces being spaced from each other during the compression to define a space over the mid-circumferential portion of said carcass. The tire tread band may then be applied over the mid-circumferential portion of the carcass and between said surfaces.

BACKGROUND OF THE INVENTION (1) Field of the invention

The present invention relates to the manufacture of pneumatic tires and in particular, to the manufacture of tires whose carcasses are shaped before the tread band and a possible ring-shaped reinforcing structure are applied thereon.

(2) Prior art

As it is known to the technicians in the art of tire making, it is very important to insure that the tire carcass, at the end of its shaping operation, may have a form corresponding as closely as possible to a pre-established toroidal form, that the cords contained in each carcass ply be equidistant from one another in any cross section of the latter, and that the tread band, and, above all, any ring-shaped reinforcing structure, be perfectly centered with respect to the carcass midline.

Up to the present time it has not been possible to obtain the above-indicated features in a quite satisfactory manner due to the limitations of the methods followed and the apparatus used. For example, in order to shape a carcass already built up in the form of a flat band, the method generally used was to mutually approach the bead portions of the carcass, and at the same time expand the carcass by means of compressed fluid against a rigid ring surrounding the carcass, in which a tread band, and possibly a reinforcing structure, both in the form of continuous rings, were inserted. Also, it has been suggested during the expansion of the carcass to bring two oppositely disposed bells towards the median plane of the carcass in such a manner as to leave a free space at the end of their displacement for application of the tread band and the ring-shaped reinforcing structure on the mid-circumferential portion of the shaped carcass.

These bells had a toroidal inner profile, the generatrices of which had a radius of curvature considerably greater than that corresponding to the ideal shape which the carcass had to assume, in its free expansion, for a given mutual distance of the bead cores and a stated disposition of the cords in the carcass plies. Moreover, the minimum diameter of the bells was considerably greater than that of the bead cores of the carcass, and their maximum diameter was practically equal to that of the top portion of the shaped carcass.

In the first case, in which the carcass was expanded against the tread-supporting ring, it was never practically possible to obtain an exact coincidence of the median plane of the shaped carcass with the midline of the tread and/or of the ring-shaped reinforcing structure. In fact, the zone of contact between the carcass and the ring-shaped members was always slightly eccentric with respect to the midline of the latter, since the carcass, in its free expansion, was never able to assume exactly its ideal shape. This was due to the fact that in some of its zones, the carcass suffered an expansion slightly greater than the pre-established one due to a possible local spreading apart of the cords in the plies greater than that contemplated, while other zones, as for instance those concerned by the splices of the plies, which have a greater rigidity, did not reach the desired degre of expansion.

In the second case, the carcass came in contact with the bells before being completely shaped, and therefore the bells exerted a slight guiding action on the last phase of the expansion of the carcass at its radially outermost portion. However, when the surfaces of the bells did not have an equal friction coefficient, they exerted a different action on the opposite sides of the carcass. Moreover, since the bells left a large part of the carcass surface free, they were neither able to insure a perfectly symmetrical disposition of the carcass with respect to the midline of the tread, which was applied on it in the gap left free between them, nor to prevent the carcass from being subjected to deformation during said operation. Consequently, it was not possible to obtain an exact coincidence of the midline of the tread with that of the shaped carcass.

Further, and still in respect to the exact centering of the tread band and the ring-shaped reinforcing structure on the shaped carcass, it is very important to keep the carcass portions containing the bead cores well fixed on their appropriate seats, both during the shaping of the carcass and during the application of the tread band and the possible ring-shaped reinforcing structure to the carcass. In the situation in which the shaping of the carcass generates, for the ideal profile pre-established for it, some thrusts at the portions of the carcass containing the bead cores, which thrusts have components in the axial direction which are directed in a direction opposite to that of the mutual approach of said portions, it is a common practice to provide seats for the bead cores, whose diameter increases in a direction opposite to the median plane of the carcass. These seats are therefore easily obtainable since, due to the fact that they are accessible from the outside, at least one of them can be totally or partially removed.

On the contrary, for a pre-established profile different from the above-indicated one, in which the shaping of the carcass generates at the carcass portions containing the bead cores some thrusts whose components in the axial direction are directed in the same direction as that of the mutual approach of said portions, these thrusts must be opposed from the inside of the carcass. Particularly, in the case of carcasses having relatively rigid beads which cannot be ovalized, it is necessary to provide at least one of the bead seats with means adapted to assume a diameter equal to or smaller than the inner diameter of the beads, in order to allow the removal of the finished tire and the initial positioning of the carcass, if it had been prepared separately; and a diameter greater than the inner diameter of the beads in order to oppose the above-indicated thrusts. These requirements, however, involve the need of overcoming some difficulties that arise with the necessity to operate means disposed inside the carcass to be shaped.

SUMMARY OF THE INVENTION

It is an object of the present invention to provide a method for manufacturing pneumatic tires which overcome the above disadvantages.

Briefly summarized, the method of the present invention include the operations of positioning the carcass in a substantially cylindrical form on annular supporting surfaces; shaping the carcass by mutually approaching said annular surfaces and by admitting compressed fluid inside the carcass; subjecting the shaped carcass to a slight axial compression by means of two rigid, equal and opposite surfaces having a toroidal profile axially narrower than that corresponding to the final shape of the carcass; and maintaining the carcass in this compressed condition while the tread band, and possibly a ring-shaped reinforcing structure, is applied on the carcass.

The present invention includes in carrying out the above-described operation for the manufacture of pneumatic tires the shaping of the carcass which generates, at its portions containing the bead cores, some thrusts whose components in the axial direction are directed towards the median plane of the carcass.

In the cases of tire manufacturing in which the shaping of the carcass generates, at the portions of the carcass corresponding to the bead cores, thrusts whose components in the axial direction are directed towards the median plane of the carcass, the method of the present invention includes opposing said thrusts from the inside of the carcass.

BRIEF DESCRIPTION OF THE DRAWINGS

The present invention will be more clearly understood from the following description, made with reference to an embodiment of the same illustrated by way of example in the attached drawings, in which:

FIG. 1 is a longitudinal section of an expansible drum adapted to shape a cylindrical carcass, in a rest position;

FIG. 2 is a longitudinal section of the drum of FIG. 1 in an expanded condition and the auxiliary bells associated therewith; and FIG. 3 is a sectional view taken along line 3—3 of FIG. 2.

DESCRIPTION OF THE PREFERRED EMBODIMENTS

In the figures, the reference numeral 1 refers to a shaft which is cantilevered and rotated about its own axis by any known means such as, for example, by the device disclosed in applicants' U.S. Patent 3,409,490.

A hub 2 is inserted on the free end of the shaft and is kept in place by means of a threaded locking nut 3 screwed on the terminal portion of the shaft 1 and provided with a corresponding thread. The hub 2 is provided with a flange 4, which constitutes one of the sidewalls of the building drum and is provided with an annular recess for receiving a thickened edge 5 of an expansible membrane 6, the latter forming the expansible surface of the drum. A ring 7, having a diameter smaller than the outer diameter of the flange 4 is removably fixed to the latter by means of screw 7a so that the thickened edge 5 of the membrane may be clamped between ring 7 and flange 4.

A hollow mandrel 8 is mounted for longitudinal movement on the shaft 1 and is fixed for rotation with the shaft by means of a key or the like (not shown). An anti-friction bearing 8a in the form of a bushing is provided in mandrel 8 and surrounds shaft 1. The relative longitudinal sliding movement between the shaft 1 and the mandrel 8 can also be effected, for example, by means of the apparatus disclosed in the above-indicated patent.

A hub 10 having a keyway 9a is fixed on the end of the hollow mandrel 8 nearest to the hub 2 by means of a key 9, hub 10 being provided with a flange 11 which constitutes the other sidewall of the drum. An annular recess is also provided in hub 10 to receive the other thickened edge 12 of the membrane 6.

A ring 13 is removably fixed to the flange 11 by means of screw 13a so that the thickened edge 12 of membrane 6 may be clamped between ring 13 and flange 11. The shape and outer diameter of the ring 13 are equal to those of the ring 7.

Brackets 15 are secured to the flange 11 along a circumference, at equal intervals of 30°, as seen in FIG. 3, by means of pins 14. Pins 14 are inserted in brackets 15, and a corresponding number of L-shaped bell cranks 18 are rotatably mounted on the pins 14, each of the cranks being provided with an arm 18a forming an angle of approximately 90° with the other arm 18b. The arm 18a extends into an annular recess 19 formed in a ring 20 mounted for reciprocal movement on the hub 10. An arcuate flange or sector 17 is formed on each arm 18b, as best shown in FIG. 3. The brackets 15 have a stop member 15' to limit the travel of the ring 20 towards the flange 4.

The shaft 1 has an axial duct 21 extending therethrough and a radial duct 22 communicating with the axial duct. Therefore, the inside of the membrane 6 can be put into communication with a source of fluid under pressure or with a vacuum pump through these ducts.

The revolving bells 23 and 24 shown in FIG. 2 are mounted at the side of the drum and are supported in such a manner as to be symmetrically approached to and detached from the drum mid line, for instance by means analogous to those described in the above-cited patent. The inner profiles of bells 23 and 24 are toroidal and are axially narrower (for a value of the order of a few millimeters) than the ideal outer profile of the freely shaped carcass. Also, annular rims 25 and 26 are formed on the outside of bells 23 and 24, respectively.

In operation, the expansible drum formed by membrane 6 is adjusted by bringing the flanges 4 and 11 to the distance corresponding to the setting of the tire to be shaped, as shown in FIG. 1, and by connecting the inside of the membrane 6 with a vacuum pump. The vacuum pump thus created causes the ring 20 to slide by suction towards the drum midline until it abuts against stop members 15' of the brackets 15. The sliding of the ring 20 causes a clockwise rotation of cranks 18 and sectors 17 about the pins 16, so that the sectors assume a substantially horizontal position as shown in FIG. 1, and lie on a circumference whose diameter is less than the outer diameter of ring 13. This causes membrane 6 to assume a concave outer profile, since it, too, is drawn inwardly by the vacuum introduced through conduits 21 and 22.

The cylindrical carcass 27, which may have been previously built up on a separate rigid building drum, is then inserted about the membrane 6 by disposing bead 28 on the periphery of the ring 7, and bead 29 on the periphery of the ring 13, beads 27 and 28 containing substantially inextensible wire cores 30. At this moment the vacuum pump is cut off and compressed fluid is admitted to the inside of the membrane by means of the ducts 21 and 22, and flanges 4 and 11 are mutually approached symmetrically with respect to the drum midline, as seen in FIG. 2. The admission of compressed fluid causes the expansion of the membrane 6 and of the carcass 27, while causing the ring 20 to slide in a direction opposite to the drum midline until it comes into contact with flange 11, as shown in FIG. 2. This sliding of ring 20 causes a counterclockwise rotation of cranks 18 and sectors 17 about pins 16, so that the sectors are positioned as shown in FIG. 2 to bear against the inside of membrane 6 opposite bead 29 and thus resist the horizontal component of the thrust exerted from the bead 29 towards the inside of the drum. The horizontal component of the thrust exerted from the bead 28 towards the inside of the drum is equal to the one exerted from bead 29 but in the opposite direction thereto, and is resisted by the flange 4.

After flanges 4 and 11 have reached their mutual preestablished position and the carcass has completed its expansion and free shaping, the bells 23 and 24 are symmetrically approached towards the drum midline for a mutual pre-established distance, so as to leave a space between their annular rims 25 and 26 as shown in FIG. 2. The bells thus compress the carcass, and in particular the portions of the latter which have undergone an expansion slightly greater than the pre-established one due to an unusual spreading apart of the ply cords, while insuring the correct expansion of the portions of the carcass which are expanded less, such as, for example, those portions containing splices of plies having a relatively greater rigidity.

After being settled and compressed into a perfectly symmetrical shape with respect to the position pre-established for its median plane, the carcass is maintained in this condition within the toroidal surfaces of the bells 23 and 24, and the ring-shaped reinforcing structure, if any, and the tread band are applied on the annular bands 25 and 26 of the bells, causing them to adhere at first at the mid-circumferential portion of the carcass. Then the bells are retracted away from the carcass and the reinforcing structure or the tread band is completely adhered to the latter.

If the drum and its associated components as indicated above constitute the central part of a tire building apparatus of the type described in the above-cited patent, it is then possible to automatically apply the sidewalls to the carcass, by following the process described in that patent. Otherwise, the sidewalls can be applied by hand, or in any other known manner.

In order to remove the tire from the drum, after the bells have been detached to allow the application of the sidewalls, the ducts 21 and 22 are cut off from the source of compressed fluid and are connected again with the vacuum pump. Consequently, the ring 20 is drawn towards the drum midline and sectors 17 are rotated clockwise into a horizontal position. Also, the membrane 6 is drawn towards the axis of the drum, permitting the finished tire to be easily removed from the drum, in the same manner as the carcass had been initially assembled onto it.

Of course, the principles of the invention remaining unvaried, the details of the method and apparatus may be widely varied with respect to what is described and illustrated by way of non-limiting example, without departing from the field of the invention itself.

For example, sectors 17 and their associated components may be disposed on both sidewalls of the drum. Also, the sectors may be of a different shape, may be replaced by analogous means, or may be actuated with different means, such as a completely mechanical device. Moreover, the movements of the drum members and the bells may be controlled by any means other than that disclosed in the cited patent. Further, the shaft supporting the drum may be hollow, as in the case of the above-indicated patent (if the drum of the present invention constitutes the central part of an apparatus of the type described in said patent) in order to allow the admission and discharge of compressed fluid through the shaft to a pair of lateral membranes for turning up the sidewalls on the shaped tire.

It is apparent from the above description that the present invention insures an accurate tire manufacturing process by offering several advantages.

First of all, slight axial compression of the shaped carcass, substantially on its whole outer surface, by means of bells having a profile axially narrower than the outer profile of the freely shaped carcass, and the maintaining of this compression during the application of the tread band and the ring-shaped reinforcing structure, while the thrusts generated at the portions of the carcass containing bead cores are efficiently opposed, results in any irregularity occurring during the free shaping of the carcass being balanced. Thus the carcass is symmetrical with respect to the midline of the tread band and the reinforcing structure, and does not suffer any deformation during the application of said elements, since it is locked in a mold-like fashion.

In regard to the sectors disposed at one drum sidewall, it is emphasized that despite the fact that they are housed inside the tire, they can be easily actuated without resorting to any appropriate control means, by virtue of the operations of admitting compressed fluid to and discharging it from the inside of the carcass, which operations must be carried out anyway for shaping the carcass and removing it from the apparatus.

Of course, variations of the specific steps of the method herein disclosed can be made by those skilled in the art without departing from the invention as defined in the appended claims.

We claim:

1. A method for the manufacture of pneumatic tires comprising the steps of positioning a cylindrical built-up tire carcass on an expansible body comprising a resilient membrane on two annular axially movable supporting surfaces; freely shaping the carcass into a pre-established toroidal form by mutually approaching said annular surfaces and simultaneously admitting compressed fluid inside the expansible body; applying at least one movable component of outward thrust against the interior of said expansible body in the region of the portion of the carcass containing the bead cores to establish and maintain said free shape uniform on both sides of the median plane of the carcass; shaping the carcass into its predetermined toroidal form by mutually approaching two opposing, rigid and equal surfaces of said predetermined toroidal profile into contact with said freely shaped carcass; subjecting the thus shaped carcass to a slight axial compression in the region from the portion of the carcass containing the bead cores to the proximity of the median plane by continuing to move said opposite toroidal surfaces whose profile is axially narrower than that corresponding to the ideal shape of the freely shaped carcass to within a predetermined spaced distance from each other at said median plane to define a space over the mid-circumferential portion of said carcass; and applying at least a tire tread-band over said mid-circumferential portion of said carcass and between said surfaces.

2. The method as in claim 1, further comprising the step of applying a ring-shaped reinforcing structure over said mid-circumferential portion of said carcass before the application of said tread band.

3. The method as defined in claim 1, wherein the outward thrusts directed away from the median plane of the carcass are generated at the portions of the carcass containing the tire bead cores counter to be inward movement of said portions to the expansion of the carcass from the inside of the carcass during the shaping of the latter and the application onto it of at least the tread band.

4. The method as in claim 1, wherein both the annular supporting surfaces and the rigid surfaces having a toroidal profile are symmetrically displaced with respect to the median plane of the carcass.

References Cited

UNITED STATES PATENTS

| | | | |
|---|---|---|---|
| 2,814,331 | 11/1957 | Vanzo et al. | 156—123 |
| 2,988,132 | 6/1961 | Vanzo et al. | 156—415 |
| 3,107,192 | 10/1961 | McNenney | 156—416 |
| 3,374,138 | 3/1968 | Porter et al. | 156—416 |
| 3,433,695 | 3/1969 | Caretta et al. | 156—415 |

BENJAMIN A. BORCHELT, Primary Examiner

R. E. HART, Assistant Examiner